US007018957B2

(12) United States Patent
Becker

(10) Patent No.: US 7,018,957 B2
(45) Date of Patent: Mar. 28, 2006

(54) METHOD OF USING HIGH MOLECULAR WEIGHT DEMULSIFIERS

(75) Inventor: Harold Becker, Tomball, TX (US)

(73) Assignee: BJ Services Company, Houston, TX (US)

( * ) Notice: Subject to any disclaimer, the term of this patent is extended or adjusted under 35 U.S.C. 154(b) by 51 days.

(21) Appl. No.: 10/371,621

(22) Filed: Feb. 21, 2003

(65) Prior Publication Data

US 2004/0167308 A1    Aug. 26, 2004

(51) Int. Cl.
*C10M 175/04* (2006.01)

(52) U.S. Cl. .............. 508/111; 508/467; 508/468; 525/329.4; 525/329.7

(58) Field of Classification Search ................ 508/467, 508/468, 8, 12, 13, 111; 525/329.4, 329.7; 526/303.1, 319, 341, 346
See application file for complete search history.

(56) References Cited

U.S. PATENT DOCUMENTS

| 4,011,388 | A | * | 3/1977 | Murphy et al. .............. 526/320 |
| 4,088,589 | A | * | 5/1978 | Rossi et al. ................... 508/467 |
| 4,582,628 | A | * | 4/1986 | Buriks et al. ................ 516/185 |
| 4,609,704 | A | * | 9/1986 | Hausman et al. ........... 524/710 |
| 4,614,235 | A | * | 9/1986 | Keener et al. ............... 166/301 |
| 4,650,596 | A | * | 3/1987 | Schlueter et al. ........... 508/471 |
| 5,156,767 | A | * | 10/1992 | Fitzgerald et al. ........... 516/136 |
| 5,349,019 | A | * | 9/1994 | Wirtz et al. ................... 525/217 |

FOREIGN PATENT DOCUMENTS

| DE | 3226252 | * | 1/1984 |
| JP | 403157418 | * | 7/1991 |
| RU | 2095117 | * | 11/1997 |

* cited by examiner

*Primary Examiner*—Bernard Lipman
(74) *Attorney, Agent, or Firm*—Jones & Smith, LLP; John Wilson Jones

(57) ABSTRACT

Homopolymers and copolymers of an esterified reaction product of an epoxidized mono-hydroxyl alcohol and a free radical polymerizable monomer are highly effective demulsifying agents. The molecular weight of the polymer is between from about 10,000 to about 500,000. The epoxidized mono-hydroxyl alcohol is preferably a reaction product of a $C_6$–$C_{30}$ linear or branched alcohol and an alkylene oxide. The alkylene oxide is preferably either ethylene oxide, propylene oxide or butylenes oxide or a mixture thereof. The free radical polymerizable monomer is preferably a vinyl aromatic compound or an acrylic or methacrylic based monomer. The polymer preferably comprises a micellar assembly. Such polymers are highly effective in demulsifying crude oils having API gravities of from 8 to 28 or a crude oil having a viscosity between from about 3 to about 10,000 CPS @ at 25° C.

31 Claims, No Drawings

METHOD OF USING HIGH MOLECULAR WEIGHT DEMULSIFIERS

FIELD OF THE INVENTION

The invention relates to homopolymers as well as copolymers of epoxidized mono-hydroxyl alcohol esters; the homo- or copolymers having a weight average molecular weight between from about 10,000 to 500,000 Daltons. Such homo- and copolymers are highly effective in the treatment of crude oil.

BACKGROUND OF THE INVENTION

Petroleum crude oils often contain variable amounts of water that are emulsified within the oil. These emulsions can be very stable and difficult to disrupt. As such, such emulsions present problem to further processing of crude oils. Oil-external water-internal emulsions are sometimes rejected because of their excessive water content. Thus, the producing company must address the issue of water-in-oil emulsions in order to sell the crude oil they produce.

In the first half of the $20^{th}$ century, calcium hydroxide hydrolyzed fats and sulfonated oils were used to break oil-external water-internal emulsions. With the advent of epoxides (e.g., ethylene oxide, propylene oxide, and butylene oxide) in the 1940's, new products, such as oxyalkylated alcohols and amines, were produced which were shown to have high specific activity for the breaking of such emulsions. Since around 1945 to the present day, enormous arrays of products that employ epoxides have been produced which vary in effectiveness from no activity (failing to break the emulsion) to highly active (capable of breaking the emulsion immediately). In the late 1950's, it was determined that the molecular weight of such epoxides was key to their effectiveness to completely resolve emulsions. Since that time, attempts have been made to increase the molecular weight of such demulsifying agents.

One of the more successful means of increasing the molecular weight was seen with bis-phenol-diepoxide adducts of the oxyalkylated derivatives or the virtual molecular weight doubling of the derivative. Additional attempts that met with partial success included the use of diisocyanates as well as dicarboxylic acids as molecular weight extension agents. Further, some unsuccessful attempts were made to oxyalkylate polyvinyl alcohol. Efforts continue today to develop a composition capable of demulsifying crude oil emulsions.

SUMMARY OF THE INVENTION

High molecular weight homopolymer and copolymer demulsifiers, having a weight average molecular weight between from about 10,000 to about 500,000 Daltons, are the reaction products of an epoxidized mono-hydroxyl alcohol and a free radical polymerizable monomer. The epoxidized mono-hydroxyl alcohol includes ethoxylated, propoxylated as well as butoxylated derivatives of mono-hydroxyl alcohols.

The homopolymers and copolymers of the invention are highly effective as deemulsification agents in the treatment of crude oil, especially crude oil having an API gravity of from about 8 to about 28 or a viscosity from about 3 to about 10,000 CPS @ 25° C.

DETAILED DESCRIPTION OF PREFERRED EMBODIMENTS

The homopolymers or copolymers of the invention exhibit a weight average molecular weight between from about 10,000 to about 500,000 Daltons and are derived from epoxidized mono-hydroxyl alcohols, or oxyalkylated alcohols, and a free radical polymerizable monomer. The weight ratio molecular weight of the epoxidized mono-hydroxyl alcohol: free radical polymerizable monomer is generally between from about 3:1 to about 8.1.

In a preferred mode, a toluene/water azeotrope is distilled from the esterifying mixture of free radical polymerizable monomer and epoxidized mono-hydroxyl alcohol in the presence of a radical scavenger and mineral acid and air. The radical scavenger can be any known in the art and is preferably used in an amount of from about 0.05 to about 0.1 weight percent based on the total weight of epoxidized mono-hydroxyl alcohol and polymerizable monomer. Preferred as radical scavenger are hydroquinone and the methyl ether of hydroquinone (MEHQ). The mixture is held at reflux for an extended esterification period, typically from about 3 to about 8 hours, preferably about eight hours. Typically, the mixture is refluxed at a temperature of between about 100 to about 130° C.

Free radical initiators useful in polymerizing the esterified reaction product include benzoyl peroxide, lauroyl peroxide, 2,2'-azobis (isobutyronitrile), azoisobutyronitrile (such as Vaso 64), potassium per sulfate and the like. The initiators are used in the polymerization in amounts ranging between 0.002 to 0.2 percent by weight of the esterified reaction product. It is known that the molecular weight of the precursor oxyalkylated alcohols determines the concentration and thus the viscosity of the reaction product. For instance, an oxyalkylated alcohol having a molecular weight above 500 grams/mole yields a product with a maximum monomer concentration of 12%; the concentration of monomer during polymerization being low. In accordance with polymer kinetic theory, the molecular weight of the polymer is directly proportional to the monomer concentration, inversely proportional to temperature, and inversely proportional to the square of the initiator concentration. Thus, with low monomer concentration, relatively high temperature, and high initiator loading molecular weights can be easily controlled.

Once the ester has formed, the mixture is cooled from reflux and is optionally mixed with another polymerizable monomer and sparged with an inert gas, such as nitrogen. The initiator is added and the temperature held at 60 to 65° C. for 8 hours. The reaction product exhibits a viscosity of from about 3 to about 10,000, preferably from about 500 to about 1500, CPS @ 25° C.

The epoxidized mono-hydroxyl alcohol is derived from an alkylene oxide as well as mono-hydroxyl alcohol. The resulting oxyalkylated product must be terminated with a primary hydroxyl group to ensure ease of esterification. The molar ratio of alkylene oxide:mono-hydroxyl alcohol is generally between from about 3:1 to about 10:1. Preferred as the alkylene oxide are ethylene oxide, propylene oxide, butylene oxide as well as mixtures thereof.

The mono-hydroxyl alcohol typically contains from about 6 to about 60, preferably from about 6 to about 30, carbon atoms, as well as mixtures thereof, and may be branched (for example, with a branched methyl group) or linear. The alcohol further may be saturated or unsaturated. Examples of suitable alcohols are palmityl, hexadecyl, stearyl, octadecyl, eicosyl, docosyl, tetracosyl, hexacosyl, octacosyl and triacontyl alcohols, as well as oleyl and linoleyl alcohols and branched alcohols. Specific examples of $C_6$ to $C_{60}$ alcohols include those sold under the trade name ALFOL, such as those of the formula $C_nH_{2n+1}(C_2H_4OH)$. ALFOL alcohols are typically formed by polymerizing ethylene in the presence of a Ziegler Natta catalyst such as those derived from an aluminum trialkyl and titanium tetrachloride. The linear polyethylene is then terminated with ethylene oxide to form the alcohol. Preferred synthetic, primary, straight-chain alcohol(s) containing 12 to 18 carbon atoms, including that sold under the trade name Alfol 1218; mixtures of $C_{12}$–$C_{28}$ primary alcohols having mostly $C_{20}$ alcohols as determined by GLC (gas-liquid-chromatography), including those sold under the trade name Alfol 20+; $C_{18}$–$C_{28}$ primary alcohols containing primarily $C_{22}$ alcohols, sold under the trade name Alfol 22+ alcohols; and a mixture of primarily straight chain, primary alcohols having from 8 to 10 carbon atoms, including that sold under the trade name of Alfol 810. In a preferred embodiment, the epoxidized mono-hydroxyl alcohol is a product of a $C_6$ linear alcohol condensed with 6 moles of ethylene oxide (such as Alfonic 6—6), a $C_8$–$C_{10}$ linear alcohol with 2 moles of ethylene oxide added (such as Alfonic 810-2).

In addition, the alcohol may be an OXO alcohol. Such alcohols may include mixtures containing branched, unbranched, linear and nonlinear alcohols. For instance, such alcohol mixtures may contain at least 20% by weight of branched and at most 80% by weight of unbranched alcohols containing 12 to 15 carbon atoms. Such oxoalcohols include branched chain alcohols of Ethyl Corporation. These include the mixtures $C_6$–$C_{30}$ alcohols; for example, about 75% by weight of a straight chain $C_{22}$, 15% of a $C_{20}$ and about 8% of $C_{18}$ and $C_{24}$ alcohols, sold under the commercial name Adol 60 and marketed by Ashland Chemical. A preferred OXO alcohol is isooctadecyl alcohol, marketed by Hoechst. Methods of manufacturing OXO alcohols are well known in the art and are generally described in Kirk-Othmer, Encyclopedia of Chemical Technology, Volume 16, 3rd ed., John Wiley & Sons, pp. 637–653, 1981. In this process, olefins are hydroformylated by reaction with carbon monoxide and hydrogen, generally charged as synthesis gas (syn gas) mixtures, in the presence of a cobalt catalyst in dissolved form to form a mixture of aldehydes and alcohols. Thereafter, the product mixture containing the alcohols and aldehydes is recovered. The aldehydes may be treated by known means to hydrogenate the aldehydes to form additional quantities of the corresponding alcohols.

Further, aryl, alkyl-aryl, alkyl and aryl amines, alcohols, and phenols terminated with a single primary mono-hydroxyl group are suitable for esterification with the free radical polymerizable monomer. Suitable amines and alcohols generally contain from about 10 to about 20 carbon atoms. The phenols generally contain from about 15 to about 20 carbon atoms.

The free radical polymerizable monomer is preferably a vinyl aromatic compound or is an acrylic or methacrylic based monomer. As used herein, acrylic or methacrylic based monomer means acrylic acid, methacrylic acid or an amide, ester, salt or nitrile thereof. Representative (meth)acrylic-based monomers include, but are not limited to, methyl methacrylate, ethyl methacrylate, butyl methacrylate, methyl acrylate, butyl acrylate, cyclohexyl acrylate, benzyl methacrylate, dimethylaminoethyl methacrylate, benzyl acrylate, dimethylaminoethyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexyl methacrylate, hexyl methacrylate, cyclohexyl methacrylate, lauryl methacrylate, tetrahydrofuryl methacrylate, methacrylic acid, acrylic acid, acrylonitrile, methacrylonitrile, glycidyl methacrylate, cyanoacrylate, acrylamide and methacrylamide.

The vinyl aromatic compound refers to a compound having a vinyl functional group bonded to at least one aryl ring. The vinyl aromatic compound can be substituted in the sense that another functional group can be bonded to the vinyl-functional group or the aryl ring. Preferably, the vinyl aromatic compound has a structure represented by the following formula A:

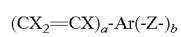

$(CX_2=CX)_a\text{-Ar}(\text{-Z-})_b$ wherein each X is the same or different and is hydrogen, alkyl, aryl or halogen; Ar is at least one aryl ring; and Z is a substituent on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9, preferably 1 to 9. X preferably is hydrogen or methyl. Ar preferably is only one aryl ring, but may be up to three rings. Ar also can be an aryl ring that include a heteroatom such as nitrogen, oxygen or sulfur. Z preferably is an alkyl group such as methyl, ethyl or tert-butyl, a halogen such as chlorine or bromine, a haloalkyl such as chloromethyl, or an oxyalkanoyl such as acetoxy. Illustrative vinyl aromatic compounds include alpha-methylstyrene, 3-methylstyrene, 4-methylstyrene (i.e., vinyl toluene), 4-tert-butylstyrene, 4-methoxystyrene, 9-vinylanthracene, 2-bromostyrene, 3-bromostyrene, 4-bromostyrene, 4-acetoxystyrene, 4-benzyloxy-3-methoxystyrene, 4-chloromethylstyrene, 4-vinylpyridine, 1,1-diphenylethylene, styrene, alpha-methyl-p-methyl styrene, 2-vinyl pyridine and divinyl benzene. Especially preferred is vinyl pyridine.

Preferred as the free radical polymerizable monomer are benzyl methacrylate, benzyl acrylate, methyl methacrylate, methyl acrylate, dimethylaminoethyl methyacrylate and dimethylaminoethyl acrylate.

Molecular weight control is important since the viscosity of the product should be sufficiently low as to allow it to be pumped into treating facilities as a liquid. The molecular weight of the homo- and copolymers of the invention is typically between from about 10,000 to about 500,000, preferably between from about 50,000 to about 100,000, Daltons. Preferably, the homo- and copolymers of the invention exhibit a viscosity between about 500 to about 1,500 CPS @ 25° C.

The demulsifiers of the invention are especially useful for resolving or separating emulsions of the water-in-oil class. In addition to resolution of petroleum water-in-oil emulsions, the demulsifiers of the invention may be used to resolve industrial emulsions, such as those encountered in sewage disposal operations, marine ballast water disposals, etc. as well as those originating from steam distillation and other production procedures.

Naturally-occurring oil-field emulsions of the water-in-oil class carry crude oil in proportions varying from a few parts per million to about 20% or even higher. The process is commonly practiced simply by introducing small proportions of the compositions of this invention into a water-in-oil class emulsion, optionally agitating to secure distribution of the reagent and incipient coalescence, and letting stand until the oil phase separates. The proportion of the compositions required will vary with the character of the emulsion to be resolved. Ordinarily, proportions of the composition required are from 1/5,000 to 1/500,000 the volume of emulsion treated; but more is sometimes required.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The compositions of this invention may be employed alone, or they may in some instances be employed to advantage admixed with other and compatible water-in-oil demulsifiers.

The compositions of this invention are especially useful in the clarification of water containing emulsified oil or suspended oily solids. The application is especially effective for the resolution of (1) water-in-oil emulsions resulting from refinery processes, (2) water-in-oil emulsions as encountered in oil fields, and (3) emulsions of cutting and rolling oils from metal working industries. The compositions of this invention may further be used in simple settling tanks or basins as well as a reagent in flotation systems.

The inventive homopolymers and copolymers may be especially useful in the treatment of crude oil, especially crude oil having an API gravities of from 8 to 28 or a viscosity from about 3 to about 100 CPS at 25° C.

The epoxidized mono-hydroxyl alcohols as well as the esterified reaction product is believed to form a micellar assembly such that their polar groups associate with each other. In turn, the non-polar groups of the water are believed to associate with each other. Such micellar arrangement of the esterified reaction product is believed to act as a migration center for water vapor to accumulate; the higher the concentration of polar species within the micelle, the stronger the diffusion gradiant force. Such micelles may consist of from as a few molecules to thousands of molecules; generally they tend to consist of aggregations that are 0.5 microns or greater in diameter.

Thus, maximization of the molecular weight of the micellar esterified reaction product is achieved by the polymerization of the free radical generating monomer and epoxidized mono-hydroxyl alcohols. Because the polymeric esterified reaction products form highly concentrated accumulations of organized polar non-ionic macrostructures (e.g., micelles), they are effective in creating a diffusion gradient between each other and other polar species such as water.

Resolution of discontinuous phases (e.g., water in oil) by surface-active components is believed to be accomplished by a diffusion mechanism. As such, the present invention provides a superior means of setting up diffusion gradients within the system.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

All percents expressed in this application refer to weight percent unless otherwise stated.

Example 1

Step I. A three neck round bottom flask was loaded with 41.68 percent of Alfonic 6—6 (a $C_6$ linear alcohol condensed with 6 moles of ethylene oxide), 8.40% acrylic acid, 49.91% toluene, 0.1% concentrated sulfuric acid, and 0.07% hydroquinone. To this flask, a subsurface air (house air) sparge, paddle stirrer, thermocouple, calibrated side-arm decanter, water cooled condenser, heating mantel, and heater control were connected. Heating was begun, and water was collected in the side-arm decanter while continuously sparging with air. After approximately 5 hours of heating, 5.4 g of water was obtained. (Theoretical yield: 6 grams.)

Step II. Polymerization of the product of Step I above was achieved by exchanging the air sparge with an inert nitrogen sparge, and placing a water-bath under the reaction flask. After a temperature of 60° C. had been set and maintained for a period of 30 minutes, and nitrogen sparge conducted for at least 30 minutes, the initiator was added. 0.1 gram of azoisobutyronitrile (Vaso inhibitor 64) was added, the reaction mixture stirred with nitrogen sparge and continued with heating at 60° C. for a period of eight hours. The product gave a viscosity increase of 500 CP after a day.

Demulsification testing on several crude oil emulsions showed this product as an effective demulsifier.

Example 2

Step I. A three neck round bottom flask was loaded with 81.7% Triton X-100 (an octyl phenol 10 mole ethylene oxide condensate), 9.39% acrylic acid, 8.17% toluene, 0.34% concentrated sulfuric acid, and 0.07% hydroquinone. To this flask a subsurface air (house air) sparge, paddle stirrer, thermocouple, calibrated side-arm decanter, water cooled condensor, heating mantel, and heater control were connected. Heating was begun, and water was collected in the side-arm decanter while continuously sparging with air. After approximately 5 hours of heating, 5.3 g of water was obtained. (Theoretical yield: 5.7 grams.)

Step II. Polymerization of the product of Step I above was achieved by exchanging the air sparge with an inert nitrogen sparge, and placing a water-bath under the reaction flask. After a temperature of 60° C. had been set and maintained for a period of 30 minutes, and nitrogen sparge conducted for at least 30 minutes, the initiator was added. 0.1 gram of Vaso 64 was added, the reaction mixture stirred with nitrogen sparge and continued with heating at 60° C. for a period of eight hours. The product exhibited a viscosity increase of 300 Centipose after a day. Demulsification testing on several crude oil emulsions demonstrated this product to have moderate to excellent activity as a demulsifier.

Example 3

Step I. A three neck round bottom flask was loaded with 37.7% Triton X-100 (an octyl phenol 10 mole ethylene oxide condensate), 40.32% Alfonic 810-2 (a $C_8$–$C_{10}$ linear alcohol with 2 moles of ethylene oxide added), 17.9% acrylic acid, 3.77% toluene, 0.32% concentrated sulfuric acid, and 0.07% hydroquinone. To this flask a subsurface air (house air) sparge, paddle stirrer, thermocouple, calibrated side-arm decanter, water cooled condenser, heating mantel, and heater control were connected. Heating was begun, and water was collected in the side-arm decanter while continuously sparging with air. After approximately 5 hours of heating 24.3 g of water was obtained. (Theoretical yield: 26 grams.)

Step II. Polymerization of the product of Step I above was achieved by exchanging the air sparge with an inert nitrogen sparge, and placing a water-bath under the reaction flask. After a temperature of 60° C. has been set and maintained for a period of 30 minutes, and nitrogen sparge conducted for at least 30 minutes, the initiator was added. 0.1 gram of Vazo 64 was added, the reaction mixture stirred with nitrogen sparge and continued with heating at 60° C. for a period of eight hours. The product gave a viscosity increase of 520 centipose after a day. Demulsification testing on several crude oil emulsions showed this product to have excellent activity as a demulsifier.

Example 4

Steps I & II. 200 grams of the product from Example 3, Step I above, was mixed with 10 grams of benzyl methyacrylate. Copolymerization of the mixture was achieved by exchanging the air sparge with an inert nitrogen sparge, and placing a water-bath under the reaction flask. After a temperature of 60° C. had been set and maintained for a period of 30 minutes, and nitrogen sparge conducted for at least 30 minutes, the initiator was added. 0.1 gram of Vazo 64 was added, the reaction mixture stirred with nitrogen sparge and continued with heating at 60° C. for a period of eight hours. The product gave a viscosity increase of 960 centipose after a day. Demulsification testing on several crude oil emulsions showed this product to have excellent activity as a demulsifier.

Example 5

A sample of oil containing emulsion (water in oil) was collected from a production area in a container having a spigot on the bottom from which the free water could be drained. Several 200 ml graduated prescription bottles were filled to the 100 ml mark and set aside for testing. A 12 ml graduated tapered centrifuge tube was filled to the 6 ml level with a solvent such as xylene, toluene, or gasoline, and 2 drops of demulsifier were added. A 6 ml sample of the crude oil containing emulsion was added, heated, and placed in a centrifuge and spun at 3,000 to 5,000 rpm for 15 minutes. After 15 minutes, the sample was then examined to determine the amount of basic sediment, and water present in the untreated oil. This procedure was repeated after the emulsified oil had been treated with the various test chemicals and used as a bench mark for success of the treatment.

Once the criteria for successful treatment had been set by the above procedure, the 100 ml samples of untreated oil were subjected to various levels of treatment with various classifications of demulsifier types (e.g., the di-epoxides, esters, resins, resin esters and demulsifiers described in this invention). The dosage range was generally set between from 100 to 500 parts per million (1–5 volume part demulsifier to 1 million volume part oil). The sample was then heated to a temperature that was consistent with that of the field, and held for a period of time which was also consistent with prevailing field conditions. During this period periodic examination of the samples was made to determine the speed and efficiency of the chemical in resolving the emulsion. Speed of water drop, clarity of both oil and water, and smoothness of the oil water interface were observed to determine the effectiveness of the chemical treatment. After exposure to temperature and time consistent with those existing under field conditions had been accomplished, an accounting of the performances was listed, and the most effective chemical was identified.

Sample A

A 25 API Gravity crude oil containing 15-volume percent water was treated with several conventional demulsifiers and also with a combination ethoxylated aryl-acrylate co-ethoxylated $C_6$ alcohol acrylate polymer. The results of this test showed that the best conventional demulsifier was a combined polyol diepoxide product that yielded 12 volume percent water after 30 min. at room temperature, while the combination acrylate of this invention dropped all the water 15 volume percent after the same interval at room temperature.

Sample B

A 8 API Gravity crude oil containing 35-volume percent water was treated with several conventional demulsifiers and also with a combination ethoxylated aryl-acrylate co-ethoxylated $C_6$ alcohol acrylate polymer. The results of this test showed that the best conventional demulsifier was a combined resin ester product that yielded 33 volume percent water after 40 min. at 70° C., while the combination acrylate of this invention dropped all the water 34.8 volume percent after the same interval at the same temperature.

Sample C

A 12 API Gravity crude oil containing 40-volume percent water was treated with several conventional demulsifiers and also with a combination ethoxylated aryl-acrylate co-ethoxylated $C_8$ alcohol acrylate polymer. The results of this test showed that the best conventional demulsifier was a combined resin ester product that yielded 37 volume percent water after 55 min. at 60° C., while the combination acrylate of this invention dropped all the water 39.8 volume percent after the same interval at the same temperature.

From the foregoing, it will be observed that numerous variations and modifications may be effected without departing from the true spirit and scope of the novel concepts of the invention.

What is claimed is:

1. A method of demulsifying a petroleum water-in-oil emulsion wherein the petroleum is a crude oil having an API gravity of from 8 to 28 which comprises:
    (A.) introducing into the emulsion a demulsifying effective amount of a liquid comprising a micellar assembly of a bomb- or copolymer of an esterified reaction product of
    an epoxidized mono-hydroxyl alcohol; and
    a free radical polymerizable monomer
    wherein the weight average molecular weight of the homo- or copolymer is between from about 10,000 to about 500,000 Daltons; and
    (B.) resolving or separating the oil-in-water emulsion by diffusion.

2. The method of claim 1, wherein the epoxidized mono-hydroxyl alcohol is a reaction product of an alkylene oxide and a $C_6$–$C_{60}$ linear or branched chain alcohol.

3. The method of claim 1, wherein the weight ratio of epoxidized mono-hydroxyl alcohol and free radical polymerizable monomer is between from about 3:1 to about 8:1.

4. The method of claim 1, wherein the free radical polymerizable monomer is an acrylic or methacrylic based monomer.

5. The method of claim 4, wherein the homopolymers or copolymer is formed by mixing a second free radical polymerizable monomer with the ester formed from the epoxidized mono-hydroxyl alcohol and the acrylic or methacrylic based monomer, and further wherein the second free radical polymerizable monomer is of the structural formula:

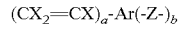

$$(CX_2=CX)_a\text{-}Ar(\text{-}Z\text{-})_b$$

wherein each X is the same or different and is hydrogen, alkyl, aryl or halogen; Ar is at least one aryl ring; and Z is a substituent on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

6. A method of demulsifying a crude oil having a viscosity between from about 3 to about 100 CPS @ 25° C. which comprises introducing to the crude oil a demulsifying effective amount of a homo- or copolymer of an esterified reaction product of:
(A.) an epoxidized mono-hydroxyl alcohol; and
(B.) a free radical polymerizable monomer
wherein the weight average molecular weight of the homo- or copolymer is between from about 10,000 to about 500,000; and
further wherein the epoxidized mono-hydroxyl alcohol is the product of an alkylene oxide and a $C_6$–$C_{60}$ linear or branched chain alcohol.

7. The method of claim 6, wherein the homo- or copolymer comprises a micellar assembly.

8. The method of claim 6, wherein the weight ratio of epoxidized mono-hydroxyl alcohol and free radical polymerizable monomer is between from about 3:1 to about 8:1.

9. The method of claim 6, wherein the free radical polymerizable monomer is an acrylic or methacrylic based monomer.

10. The method of claim 9, wherein the homopolymer or copolymer is formed by mixing a second free radical polymerizable monomer with the ester formed from the epoxidized mono-hydroxyl alcohol and the acrylic or methacrylic based monomer, and further wherein the second free radical polymerizable monomer is of the structural formula:

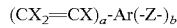

wherein each X is the same or different and is hydrogen, alkyl, aryl or halogen; Ar is at least one aryl ring; and Z is a substituent on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

11. The method of claim 6, wherein the weight average molecular weight of the homo- or copolymer is between from about 50,000 to about 100,000.

12. The method of claim 4, wherein the free radical polymerizable monomer is methyl acrylate, methyl methacrylate, benzyl methacrylate or dimethylaminoethyl methacrylate.

13. The method of claim 1, wherein the weight average molecular weight of the homo- or copolymer is between from about 50,000 to about 100,000 Daltons.

14. The method of claim 1, wherein the alkylene oxide is ethylene oxide, propylene oxide, butylene oxide and mixtures thereof.

15. The method of claim 2, wherein the mono-hydroxyl alcohol is a saturated or unsaturated $C_6$–$C_{30}$ linear or branched alcohol.

16. The method of claim 2, wherein the alkylene oxide is ethylene oxide, propylene oxide, butylene oxide and mixtures thereof.

17. The method of claim 9, wherein the free radical polymerizable monomer is methyl acrylate, methyl methacrylate, benzyl methacrylate, or dimethylaminoethyl methacrylate.

18. A method of demulsifying a petroleum water-in-oil emulsion of a crude oil which comprises adding to the emulsion a demulsifying effective amount of a micellar assembly consisting essentially of a homo- or copolymer of an esterified reaction product comprising an epoxidized mono-hydroxyl alcohol and a free radical polymerizable monomer.

19. The method of claim 18, wherein the weight average molecular weight of the homo- or copolymer is between from about 10,000 to about 500,000.

20. The method of claim 18, wherein the epoxidized mono-hydroxyl alcohol is a reaction product of an alkylene oxide and a $C_6$–$C_{60}$ linear or branched chain alcohol.

21. The method of claim 18, wherein the free radical polymerizable monomer is an acrylic or methacrylic based monomer.

22. The method of claim 21, wherein the homopolymer or copolymer is formed by mixing a second free radical polymerizable monomer with the ester formed from the epoxidized mono-hydroxyl alcohol and the acrylic or methacrylic based monomer, and further wherein the second free radical polymerizable monomer is of the structural formula:

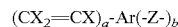

wherein each X is the same or different and is hydrogen; alkyl, aryl or halogen; Ar is at least one aryl ring; and Z is a substituent on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

23. The method of claim 18, wherein the crude oil has a viscosity between from about 3 to about 100 CPS @25° C.

24. The method of claim 19, wherein the weight average molecular weight of the homo- or copolymer is between from about 50,000 to about 100,000 Daltons.

25. The method of claim 21, wherein the free radical polymerizable monomer is methyl acrylate, methyl methacrylate, benzyl methacrylate or dimethylaminoethyl methacrylate.

26. The method of claim 18, wherein the alkylene oxide is ethylene oxide, propylene oxide, butylene oxide and mixtures thereof.

27. The method of claim 20, wherein the epoxidized mono-hydroxyl alcohol is a reaction product of an alkylene oxide and a $C_6$–$C_{30}$ liner or branched chain alcohol.

28. The method of claim 1, wherein the micellar assembly comprises aggregates that are 0.5 microns or greater in diameter.

29. The method of claim 1, wherein the homo- or copolymer has a viscosity between from about 500 to about 1,500 CPS @ 25° C.

30. The method of claim 6, wherein the homo- or copolymer has a viscosity between from about 500 to about 1,500 CPS @ 25° C.

31. A method of demulsifying a petroleum water-in-oil emulsion which comprises:
(A.) introducing into the emulsion a demulsifying effective amount of a liquid comprising a micellar assembly of a homo- or copolymer of an esterified reaction product of
an epoxidized mono-hydroxyl alcohol; and
a free radical polymerizable monomer; and
(B.) resolving or separating the oil-in-water emulsion by diffusion.

* * * * *